April 10, 1928.

F. E. DAYES 1,665,407

THROTTLE CONTROL FOR CARBURETORS

Filed Sept. 17, 1925

INVENTOR
Fredk E. Dayes
BY F. H. Gibbs
ATTORNEY

Patented Apr. 10, 1928.

1,665,407

UNITED STATES PATENT OFFICE.

FREDERICK E. DAYES, OF BROOKLYN, NEW YORK, ASSIGNOR TO AMERICAN CAR AND FOUNDRY COMPANY, OF NEW YORK, N. Y., A CORPORATION OF NEW JERSEY.

THROTTLE CONTROL FOR CARBURETORS.

Application filed September 17, 1925. Serial No. 56,981.

This invention relates to the control of the carburetors of internal combustion engines used either as stationary power plants or for propelling conveyances of any type and more particularly internal combustion engines for propelling vehicles or buses or rail cars. Where a single internal combustion engine is used for supplying the entire amount of power used in vehicles of the type mentioned, it is necessary to provide a motor of large horse power in order to obtain the high rate of acceleration and maximum rate of speed which are now usually demanded in vehicles of this type with the result that for the greater portion of its operating time the motor is of much greater capacity than is required. Where an electric generator is driven by the internal combustion engine in order to provide electricity for propelling the vehicle, the lower efficiency of the generator when operating at part load results in a further loss in the efficiency of the system as a whole.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Figs. 3 and 4 are detached views showing carburetors and operating parts hereinafter more specifically referred to.

Figure 1:
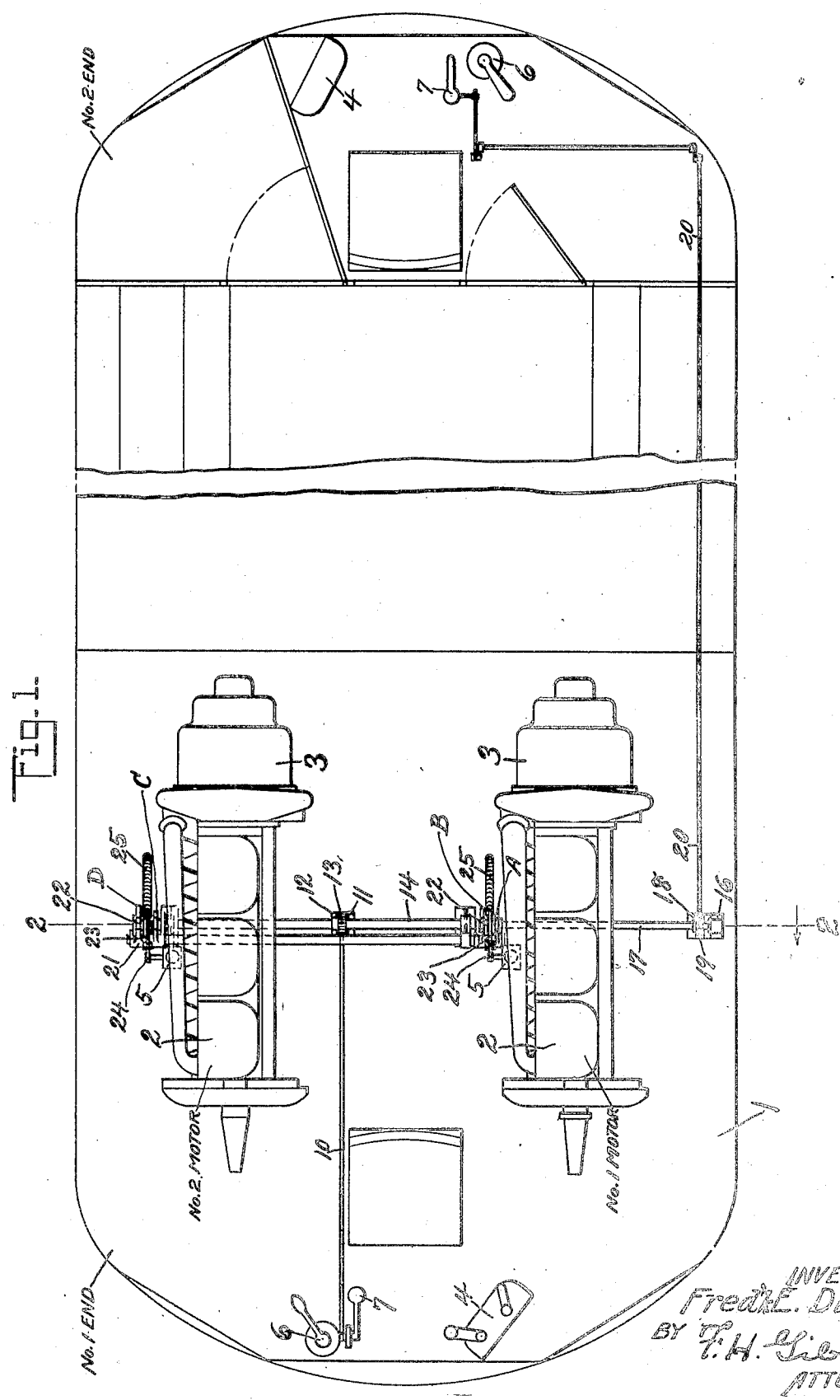
Fig. 1 is a plan view of a motor car equipped with the present invention.
Figure 2:
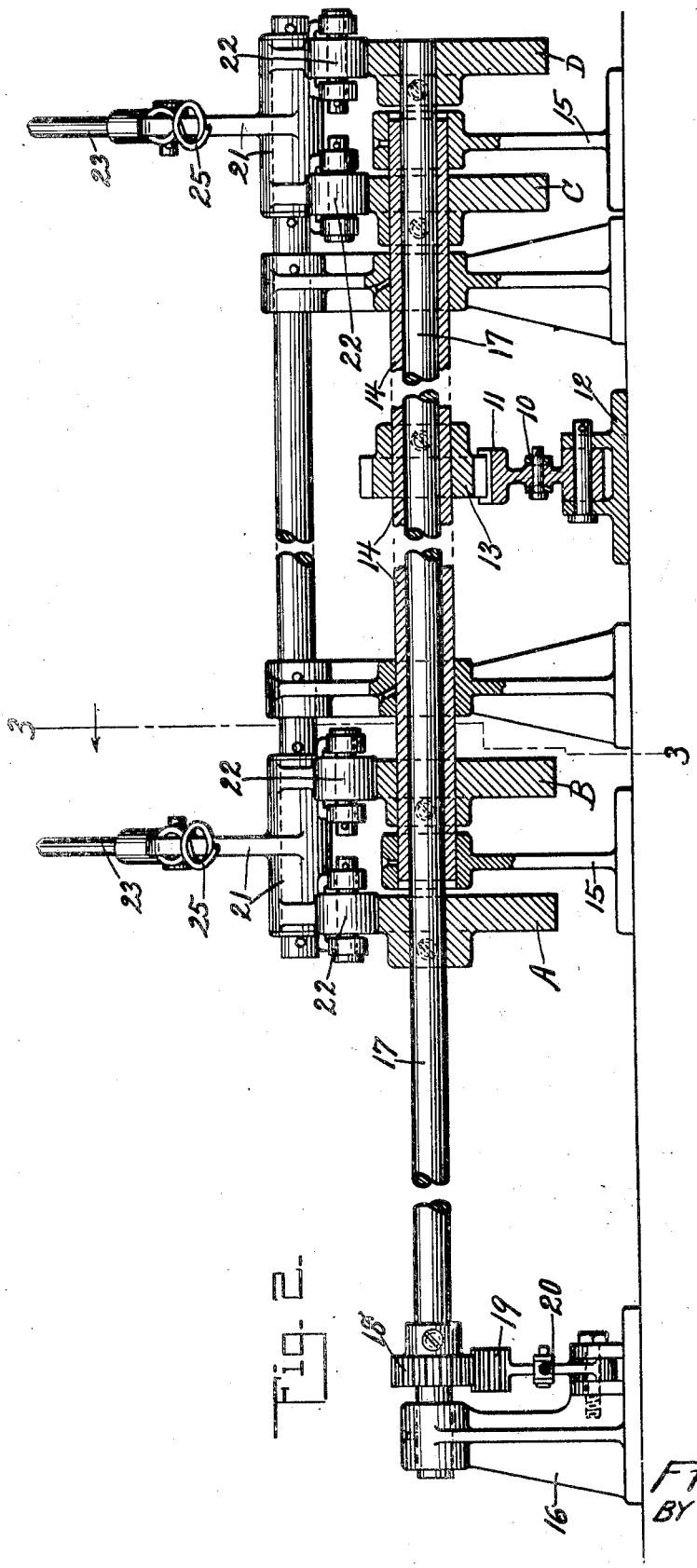
Fig. 2 is a detached view of operating shafts and associated parts hereinafter referred to taken substantially on the line 2—2 in Fig. 1 looking in the direction indicated by the arrow.
Figure 3:
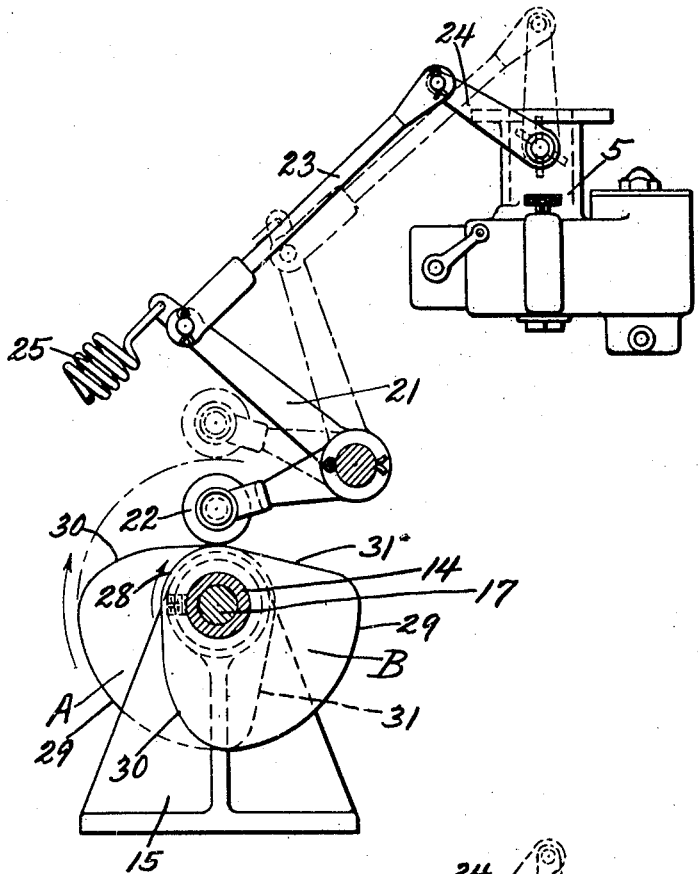
Figure 4:
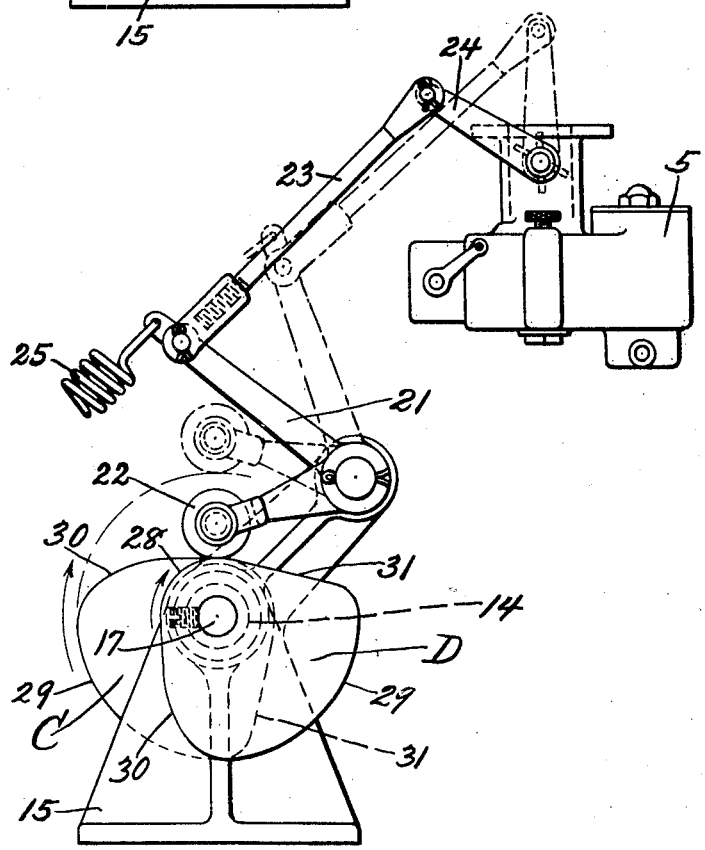

It is an object of this invention to provide control for the carburetors of a plurality of internal combustion engines or motors individually connected to electric generators or otherwise suitably connected to the load and so controlled that the full power of both engines will be available for rapid acceleration or maximum speed while one engine may be used for ordinary requirements and the other engine be shut down or run without load. It is also an object of this invention to provide a control preferably for double ended conveyances having a plurality of motors for propelling them in which a particular motor furnishes the ordinary propelling power as the conveyance is operated from each end and at times both motors are used to furnish the full power when the conveyance is operated from either end. It is also an object of this invention to provide cam controlling means for the carburetors of a plurality of internal combustion engines which can be used singly or together which permits the gradual opening of the throttle valve of the carburetor of one engine to its full or a predetermined opening while the throttle valve of the carburetor of the other engine is held to a minimum or desired opening followed by a gradual opening of the carburetor of the second engine to its full or desired opening while the throttle valve of the carburetor of the first engine is held to a predetermined opening when the conveyance is controlled from one end and which provides for a similar control of the carburetors in the reverse order when the conveyance is controlled from the opposite end.

For the purposes of illustration, the invention is shown applied to a rail car and the car 1 is provided with two internal combustion engines or motors 2 mounted at one end of the car in any desired manner and directly connected to electric generators 3 but it is to be understood that any suitable transmission means may be used to connect the engines 2 to the driven wheels of the car. As the electrical connections form no part of this invention they are omitted except the controllers 4 which are shown at the ends of the car conveniently placed for operation in controlling the car, the controllers 4 representing any controlling means suitable for the type of transmission used.

Fuel for the operation of the motors is supplied through carburetors 5 connected to the inlet ports of the motors in the usual manner and supplied with gasoline or other liquid fuel from tanks (not shown) in any desired manner. To control the operation of the carburetors, adjacent the brake valve 6 at each end there is placed an accelerator or operating lever 7, the accelerator at the motor end of the car, designated for convenience, No. 1 end, being connected by link or other suitable means 10 to a toothed sector 11 pivotally mounted in a bracket 12 carried by the car. The sector 11 engages a pinion 13 keyed on a tube or sleeve 14 journaled in the pedestals 15 mounted on the car. Keyed on the sleeve 14 are the cams B and C.

Rotatably mounted in the sleeve 14 and projecting from both ends thereof is a shaft 17 which has one end journaled in pedestal 16 and has cam D keyed on its other end. On the shaft 17 between pedestals 15 and 16 are keyed a cam A and a pinion 18 which is engaged by a toothed sector 19 pivotally mounted on the base of the pedestal 16. The sector 19 is operated by a link or rod 20 connected with the accelerator 7 at the No. 2 end of the car or the end opposite the motor end. While the sleeve 14 and shaft 17 have been shown mounted below the motors they may be mounted otherwise.

It will be noted that the arrangement of the cams on the shaft 17 and sleeve 14 brings a cam on the shaft adjacent to a cam on the sleeve, cam A on the shaft 17 being adjacent cam B on the sleeve 14 and cam D on the shaft 17 adjacent to cam C on the sleeve 14.

Pivotally mounted adjacent the cams A and B is a bell crank lever 21 having rollers 22 mounted in the end of one arm and positioned to bear on the cams A and B. The other arm of the bell crank lever 21 is pivotally connected to one end of a link 23 which has its other end pivotally connected to the valve operating arm 24 of the carburetor attached to the motor, designated No. 1 motor, which is at the left side of the car when No. 1 end is the front of the car. A spring 25 connected to the car and to the bell crank lever 21 adjacent the connection of link 23 thereto keeps one of the rollers 22 bearing on one of the cams A and B and prevents chattering of the roller on the cam and variations of the opening of the carburetor valve by the shocks of operating.

Pivotally mounted adjacent to the cams C and D is a similar bell crank lever 21 carrying rollers 22 which engage with the cams C and D and having a connection through link 23 with the valve operating arm 24 of the carburetor 5 for the other motor, designated No. 2 motor. A spring 25 is also provided to hold the rollers 22 against the cams.

It will be noted that both the shaft 17 and sleeve 14 have cams fixed thereon which engage with both bell crank levers so that by operating either the sleeve 14 from No. 1 end or the shaft 17 from No. 2 end both motors may be controlled. The cams are of similar contour and each comprise a portion 28 of uniform radius and a portion 29 of uniform but greater radius, joined at one end by the curved portion 30 of gradually increasing radius and at the other end by a flat portion 31. To provide for the successive control of the two motors the pairs of cam on the shaft 17 and sleeve 14 are positioned differently on the shaft and sleeve with respect to their respective crank arms 21. As each pair is identical in arrangement only the operation of the pair of cams A and D will be described.

As positioned on the shaft 17, assuming the car to be stopped and the motors idling, the cams A and D both have the portions 28 of uniform radius in engagement with the respective rollers 22 but the cam A is advanced with respect to the cam D so that a movement of the shaft 17 in a clockwise direction will cause the curved portion 30 of cam A to operate its bell crank lever 21 to open the throttle valve of the carburetor of No. 1 motor while the portion 28 of cam D passes beneath its bell crank lever and does not affect the carburetor of No. 2 motor,— the carburetors being adjusted so that the motors will idle at any desired speed while the portions 28 of the cams are beneath the bell crank levers 21. Continued operation of the shaft 17 in a clockwise direction continues the operation of the bell crank lever 21 for the carburetor of No. 1 motor by the portion 30 of cam A until the carburetor valve is fully opened or reaches the maximum opening desired and the roller 22 is at the beginning of portion 29 of cam A which is of a radius to hold the carburetor valve fully opened or at maximum desired opening. Meanwhile the portion 28 of the cam D has been passing beneath its bell crank lever 21 and reaches a position with the beginning of portion 30 beneath the bell crank lever 21 just as the cam A reached a position with the beginning of portion 29 beneath its bell crank lever 21. Further operation of the shaft 17 in a clockwise direction causes the portion 30 of cam D to open the valve of the carburetor of No. 2 motor while the portion 29 of cam A holds the valve of the carburetor of No. 1 motor opened until the valve for No. 2 motor is fully opened or reaches the maximum opening desired. Operating the shaft in the opposite direction will cause the valve for No. 2 motor to be gradually closed, the valve for No. 1 motor being held in the opened position until No. 2 motor is returned to the idling condition whereupon further operation of the shaft will cause the valve for No. 1 motor to be gradually closed until No. 1 motor is returned to the idling condition.

On the sleeve 14 which is operated from the No. 1 end the cam C is placed in advance of the cam B so that No. 2 motor is first brought into use and then No. 1 motor. This arrangement permits of one motor being used for the general running when operating from one end of the car while the other motor is used for the same purpose when operating from the other end of the car, the second motor in both cases being available when the car is operated from either end to supply the additional power necessary for rapid acceleration or maximum speed or to operate the car in case the motor ordinarily used is disabled.

While this invention has been shown applied to a rail car, it is to be understood that it is applicable in all cases where a common control of a plurality of carburetors is desired.

What is claimed is:

1. In combination, a plurality of carburetors, a plurality of cams adapted to operate each of said carburetors, and a plurality of devices each adapted to operate one cam associated with each carburetor, said devices operating the cams to effect operation of the carburetors in different orders from different points.

2. In combination, a plurality of carburetors, a plurality of common controlling means for said carburetors, each of said common controlling means operating the carburetors in succession, and means for operating the various controlling means separately and from different points.

3. In combination with a conveyance, a plurality of internal combustion engines for supplying propelling power for said conveyance, individual carburetors for said engines and means common to the carburetors for controlling the same in succession from both ends of said conveyance, the carburetors being controlled in different orders from the different ends of said conveyance.

4. In combination with a conveyance, a plurality of independent internal combustion engines for supplying propelling power for said conveyance, individual carburetors for said engines and means for controlling said carburetors in succession from both ends of said conveyance, said controlling means operating the first operated carburetor toward open position before operating the second operated carburetor.

5. In combination with a conveyance, a plurality of internal combustion engines for supplying propelling power for said conveyance, individual carburetors for said engines and means for controlling said carburetors in succession from both ends of said conveyance and for operating the carburetors in different orders from different ends of the conveyance, said controlling means operating the first operated carburetor toward open position before operating the second operated carburetor and holding said first operated carburetor in such position while operating said second operated carburetor toward open position.

6. In combination, a plurality of internal combustion engines for supplying power to a common means, individual carburetors for said engines, a plurality of cams adapted to operate each carburetor, and means for operating the different cams associated with each carburetor from different points.

7. In combination, a plurality of internal combustion engines for supplying power to a common means, individual carburetors for said engines, a plurality of cams adapted to operate each carburetor, and a plurality of devices for operating one cam associated with each carburetor from a number of different points, said devices successively operating said carburetors in different orders from the different points.

8. In combination with a conveyance, a plurality of internal combustion engines for supplying propelling power for said conveyance, individual carburetors for said engines, a plurality of independently operable cams for operating each carburetor and common operating means for cams of each carburetor operated from each end of the conveyance.

9. In combination with a conveyance, a plurality of internal combustion engines for supplying propelling power for said conveyance, individual carburetors for said engines, a plurality of cams for operating each carburetor and common operating means for cams of each carburetor operated from each end of the conveyance, said carburetors being operated in succession from each end of the conveyance.

10. In combination with a conveyance, a plurality of internal combustion engines for supplying propelling power for said conveyance, individual carburetors for said engines, a plurality of cams for operating each carburetor and common operating means for cams of each carburetor operated from each end of the conveyance, said carburetors being operated in succession in different orders from the two ends of the conveyance.

11. In combination with a conveyance, a plurality of internal combustion engines for supplying propelling power for said conveyance, individual carburetors for said engines, a plurality of independently operable cams for operating each carburetor and common operating means for cams of each carburetor operated from each end of the conveyance, said carburetors being operated in succession from each end of the conveyance, the first operated carburetor being held in a predetermined open position while the second carburetor is operated.

12. In combination with a conveyance, a plurality of internal combustion engines for supplying propelling power for said conveyance, individual carburetors for said engines, a plurality of cams for operating each carburetor and common operating means for cams of each carburetor operated from each end of the conveyance, said carburetors being operated in succession in different orders from the two ends of the conveyance, the first operated carburetor being held in a predetermined open position while the second carburetor is operated.

13. In combination, a plurality of carburetors and a plurality of common controlling means for said carburetors operative from different points to operate said carburetors in different orders.

14. In combination, a plurality of carburetors and a plurality of common controlling means for operating said carburetors, each controlling means operating the carburetors in succession in a different order than the other controlling means.

15. In combination, a plurality of carburetors and a plurality of common controlling means for operating said carburetors in succession, said controlling means being operative from different points and operating said carburetors in different orders.

16. In a motor vehicle, a plurality of independent motors operatively connected with the vehicle drive means, and common control means for successively bringing the motors into operation to successively increase the acceleration of the motors.

17. In a motor vehicle, a plurality of independent motors operatively connected with the vehicle drive means, and means common to both of said motors for successively bringing the motors into operation and rendering any one or more of them inoperative or operative at will as desired.

18. In a motor vehicle, a plurality of independent spaced power plants arranged thereon, and means connecting said power plants whereby they may be successively brought into operation to increase the vehicle acceleration.

19. In a motor vehicle, a plurality of independent power plants arranged thereon, and successively brought into operation to increase the rate of vehicle acceleration, and reversely rendered inoperative to decrease the rate of vehicle acceleration.

20. In a motor vehicle, a plurality of independent internal combustion engines for supplying power to a common drive means, individual carburetors for the engines, and a common actuating mechanism for controlling either of the carburetors or all as desired.

21. In a conveyance, an internal combustion engine on each side of the median line through said conveyance for supplying propelling power for said conveyance, a carburetor for each engine, a plurality of sets of cams for operating said carburetors, and means for controlling said carburetors in succession from both ends of the conveyance.

22. In a conveyance, an internal combustion engine on each side of the median line through said conveyance for independently supplying propelling power for said conveyance, a carburetor for each engine, a plurality of sets of cams for operating said carburetors, and means for actuating the cams of each set in succession from both ends of the conveyance whereby to operate said carburetors in succession, said cams being controlled in different orders from the different ends of the conveyance.

23. In a conveyance, an internal combustion engine on each side of the median line through the conveyance for independently supplying propelling power for said conveyance, a carburetor for each engine, and means operable from both ends of the conveyance for controlling the operation of said carburetors in succession, the carburetors being controlled in different orders from the different ends of the conveyance.

24. In a conveyance, internal combustion engines on opposite sides of the median line through the conveyance, a carburetor for each engine, a plurality of actuators for each carburetor, and means for controlling the operation of said actuators in succession.

25. In a conveyance, internal combustion engines on opposite sides of the median line through the conveyance, a carburetor for each engine, a plurality of actuators for each carburetor, and means for controlling the operation of said actuators in succession, said actuators being controlled in different orders from the different ends of the conveyance.

26. In a vehicle, a plurality of independent motors, a carburetor for each motor, means connecting said carburetors for successively bringing the motors into operation to increase the rate of acceleration of said vehicle.

27. In a vehicle, a motor on each side of the median line through the vehicle, said motors being connected to a common drive means, a carburetor for each motor, and means common to each carburetor for successively bringing the motors into operation or to successively place the motors in inoperative condition as desired.

In witness whereof I have hereunto set my hand.

FREDERICK E. DAYES.